US009465946B2

(12) United States Patent
Goffman et al.

(10) Patent No.: US 9,465,946 B2
(45) Date of Patent: Oct. 11, 2016

(54) IDENTIFICATION AND EXECUTION OF SUBSETS OF A PLURALITY OF INSTRUCTIONS IN A MORE SECURE EXECUTION ENVIRONMENT

(75) Inventors: Sergei Goffman, Haifa (IL); Alex Berenzon, Zichron Yaacov (IL); Oron Lenz, Ein-Carmel (IL); Tevi Devor, Zichron Yaacov (IL); Bo Zhang, Raleigh, NC (US); Yoram Zahavi, Zichron Yaacov (IL); Moshe Maor, Kiryat Mozking (IL)

(73) Assignee: Intel Corporation, Santa Clara, CA (US)

( * ) Notice: Subject to any disclaimer, the term of this patent is extended or adjusted under 35 U.S.C. 154(b) by 354 days.

(21) Appl. No.: 13/997,899

(22) PCT Filed: Jun. 1, 2012

(86) PCT No.: PCT/US2012/040597
§ 371 (c)(1),
(2), (4) Date: Jun. 25, 2013

(87) PCT Pub. No.: WO2013/180736
PCT Pub. Date: Dec. 5, 2013

(65) Prior Publication Data
US 2014/0047245 A1    Feb. 13, 2014

(51) Int. Cl.
*G06F 11/30*    (2006.01)
*G06F 21/60*    (2013.01)
(Continued)

(52) U.S. Cl.
CPC ........... *G06F 21/602* (2013.01); *G06F 21/125* (2013.01); *G06F 21/53* (2013.01); *G06F 21/54* (2013.01)

(58) Field of Classification Search
CPC .................................................... G06F 21/125
USPC ............................................................. 713/190
See application file for complete search history.

(56) References Cited

U.S. PATENT DOCUMENTS 4,817,140 A    3/1989    Chandra et al.
7,051,211 B1    5/2006    Matyas, Jr. et al.
(Continued)

FOREIGN PATENT DOCUMENTS

DE    102005048029 A1    4/2007
TW    201337620 A    9/2013

OTHER PUBLICATIONS

International Preliminary Report on Patentability mailed Dec. 11, 2014 for International Application No. PCT/US2012/040597, 8 pages.
(Continued)

*Primary Examiner* — Teshome Hailu
(74) *Attorney, Agent, or Firm* — Schwabe, Williamson & Wyatt, P.C.

(57) ABSTRACT

Embodiments of apparatus, computer-implemented methods, systems, devices, and computer-readable media are described herein for identifying and encrypting a subset of a plurality of instructions, for execution in a more secure execution environment. In various embodiments, the subset may include a single entry point and a single exit point. In various embodiments, one or more instructions of the plurality of instructions that precede or follow the subset may be executed in a first execution environment with a first security level. In various embodiments, the subset may be executed in a second execution environment with a second security level that is more secure than the first security level.

19 Claims, 5 Drawing Sheets

(51) Int. Cl.
  *G06F 21/12*   (2013.01)
  *G06F 21/53*   (2013.01)
  *G06F 21/54*   (2013.01)

(56) References Cited

U.S. PATENT DOCUMENTS

| | | |
|---|---|---|
| 8,296,551 B2 | 10/2012 | Bungion |
| 2004/0064723 A1 | 4/2004 | Barnes et al. |
| 2005/0210287 A1 | 9/2005 | Paatero |
| 2006/0095793 A1 | 5/2006 | Hall |
| 2007/0079112 A1* | 4/2007 | Lewis et al. .................. 713/2 |
| 2007/0133789 A1 | 6/2007 | Scheiblhofer et al. |
| 2008/0059812 A1 | 3/2008 | Everett et al. |
| 2008/0271023 A1* | 10/2008 | Bone et al. .................. 718/100 |
| 2009/0290712 A1 | 11/2009 | Henry et al. |
| 2009/0292931 A1* | 11/2009 | Henry et al. ................. 713/190 |
| 2010/0153745 A1 | 6/2010 | Onno et al. |
| 2010/0332843 A1 | 12/2010 | Boivie |
| 2011/0154002 A1 | 6/2011 | Liu et al. |
| 2012/0017028 A1* | 1/2012 | Tsirkin .................. G06F 12/08 711/6 |
| 2013/0080805 A1 | 3/2013 | Vick et al. |
| 2014/0089679 A1 | 3/2014 | Goffmann et al. |

OTHER PUBLICATIONS

International Search Report and Written Opinion mailed Sep. 24, 2012 for International Application No. PCT/US2011/067781, 12 pages.

Maor, Moshe et al. "Software Modification for Partial Secure Memory Processing" U.S. Appl. No. 13/994,411, filed Jun. 14, 2014, 34 pages.

International Search Report and Written Opinion mailed Dec. 12, 2012 for International Application No. PCT/US2012/04597, 11 pages.

Extended European Search Report mailed Jan. 7, 2016 for European Patent Application No. 12877666.3; 7 pages.

* cited by examiner

IDENTIFICATION AND EXECUTION OF SUBSETS OF A PLURALITY OF INSTRUCTIONS IN A MORE SECURE EXECUTION ENVIRONMENT

CROSS REFERENCE TO RELATED APPLICATIONS

The present application is a national phase entry under 35 U.S.C. §371 of International Application No. PCT/US2012/040597, filed Jun. 1, 2012, entitled "IDENTIFICATION AND EXECUTION OF SUBSETS OF A PLURALITY OF INSTRUCTIONS IN A MORE SECURE EXECUTION ENVIRONMENT", which designated, among the various States, the United States of America. The Specification of the PCT/US2012/040597 Application is hereby incorporated by reference.

FIELD

Embodiments of the present invention relate generally to the technical field of data processing, and more particularly, to identification and execution of subsets of instructions in a more secure execution environment.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Software piracy and/or tampering (such as virus or malware) are widespread. Conventional anti-piracy/tampering measures such as code obfuscation, encryption and anti-debugging techniques have failed to adequately address the problem, particularly against the most determined software pirates/hackers. More robust anti-piracy/tampering measures such as hardware keys (e.g., one-time passwords on key-ring dongles), while more effective, may be inconvenient, expensive and/or inflexible.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

As used herein, the term "software" may include but is not limited to one or more instructions stored on a transitory or non-transitory medium that, when executed by a computing device, enables the computing device to perform various actions. Non-limiting examples of software include word processors, spreadsheets, image manipulation applications, games, media players, email clients, web browsers, operating systems, drivers, servers (e.g., a web server), and so forth.

Figure 1:
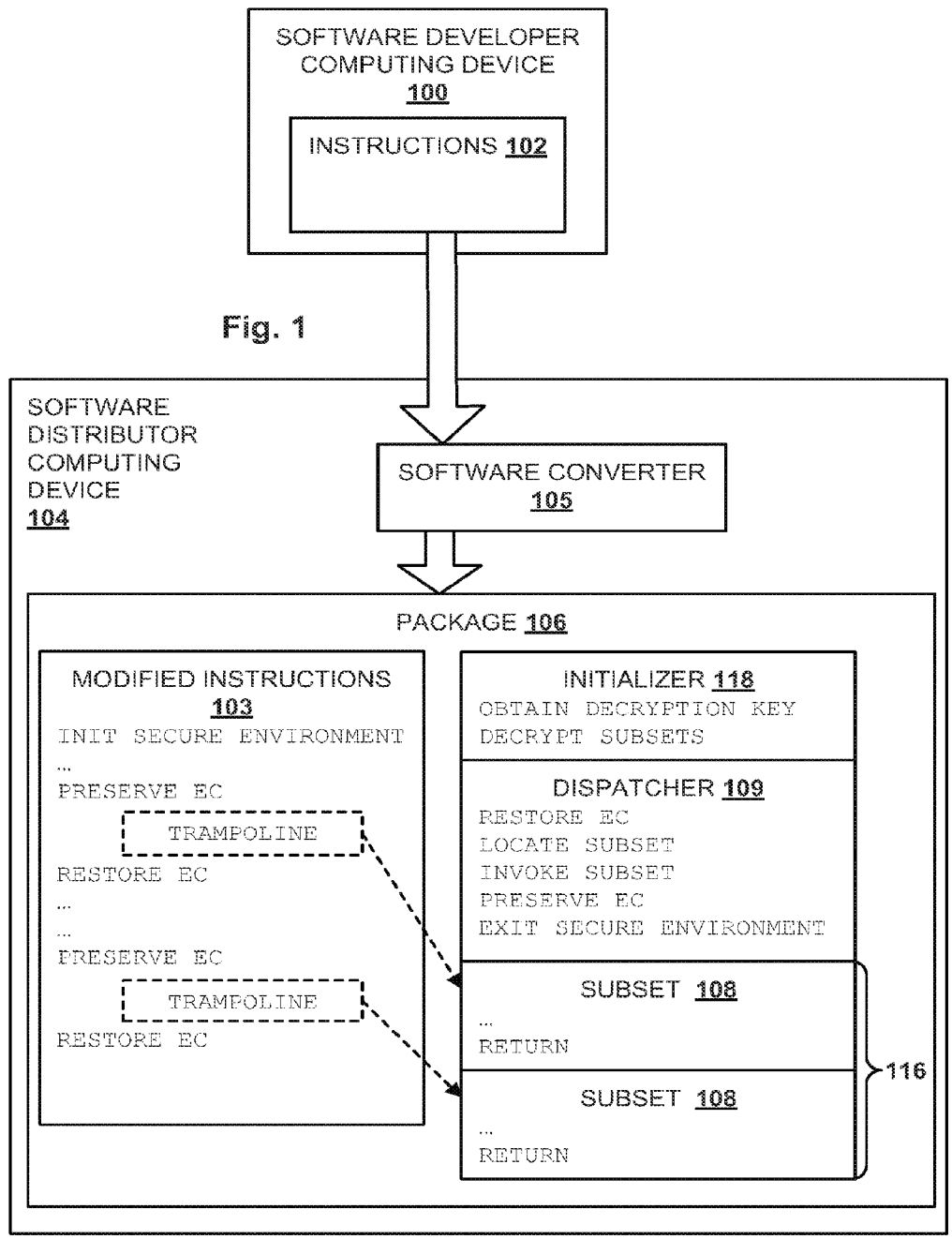
FIG. 1 schematically illustrates an example of how software in the form of a plurality of executable instructions may be created, provided to a software distributor such as an application store, and modified to provide enhanced security, in accordance with various embodiments.

Referring now to FIG. 1, a software developer computing device 100 may be one or more computing devices used by a person or group of persons, e.g., a software development firm, company, independent software vender ("ISV") and so forth, to develop software in the form of a plurality of instructions 102. In various embodiments, plurality of instructions 102 may include source code, binary instructions, assembly code, scripting language, and/or any other type of instructions that may be executed immediately or after some form of preprocessing, such as compilation, assembly, interpretation, and so forth.

As shown by the arrow in FIG. 1, in various embodiments, software developer computing device 100 may provide plurality of instructions 102 to a software distributor computing device 104. In various embodiments, software developer computing device 100 may provide plurality of instructions 102 to software distributor computing device 104 over one or more wired and/or wireless communication networks, by mailing or otherwise physically transferring a computer-readable medium storing plurality of instructions 102, and so forth.

In various embodiments, software distributor computing device 104 may host an online application store or other service that distributes software via any medium, such as over one or more wired and/or wireless communication networks, or physically, by mailing or otherwise physically transferring computer-readable media. In some embodiments, software developer computing device 100 and software distributor computing device 104 may be the same computing device or a plurality of computing devices operating in cooperation.

Plurality of instructions 102 may, by itself, not include sufficient safeguards against software piracy and/or tampering. A user may be able to view plurality of instructions 102, either before or during execution. This may allow the user to copy or modify plurality of instructions 102 in an undesirable manner. For instance, a user could edit plurality of instructions 102 to remove copyright protection mechanisms. Even if plurality of instructions 102 is in a form not readily readable by humans (e.g., object code), a determined software pirate may have reverse engineering capabilities. As a further example, a hacker may tamper with the instructions.

Accordingly, in various embodiments, plurality of instructions 102 may be converted, e.g., by a software converter 105, to a package 106 with characteristics that prevent, reduce the likelihood of and/or generally discourage software piracy/tampering. In particular, groups or "subsets" of plurality of instructions 102 may be identified, extracted and/or encrypted, and may be stored separately from remaining instructions in plurality of instructions 102. These subsets of instructions may be configured to be executed in a separate, more secure environment that prevents users from accessing the subsets of instructions.

Software converter 105 may be any combination of software and/or hardware. In FIG. 1, it is shown operating on software distributor computing device 104. However, this is not meant to be limiting, and software converter 105 may operate on other computing devices, such as software developer computing device 100. In one embodiment, software converter 105 may be a combination of multiple logics, each with a separate purpose, as will be described below. After conversion by software converter 105, package 106 may include a modified plurality of instructions 103, one or more encrypted subsets 108 and/or a dispatcher routine 109.

Figure 2:
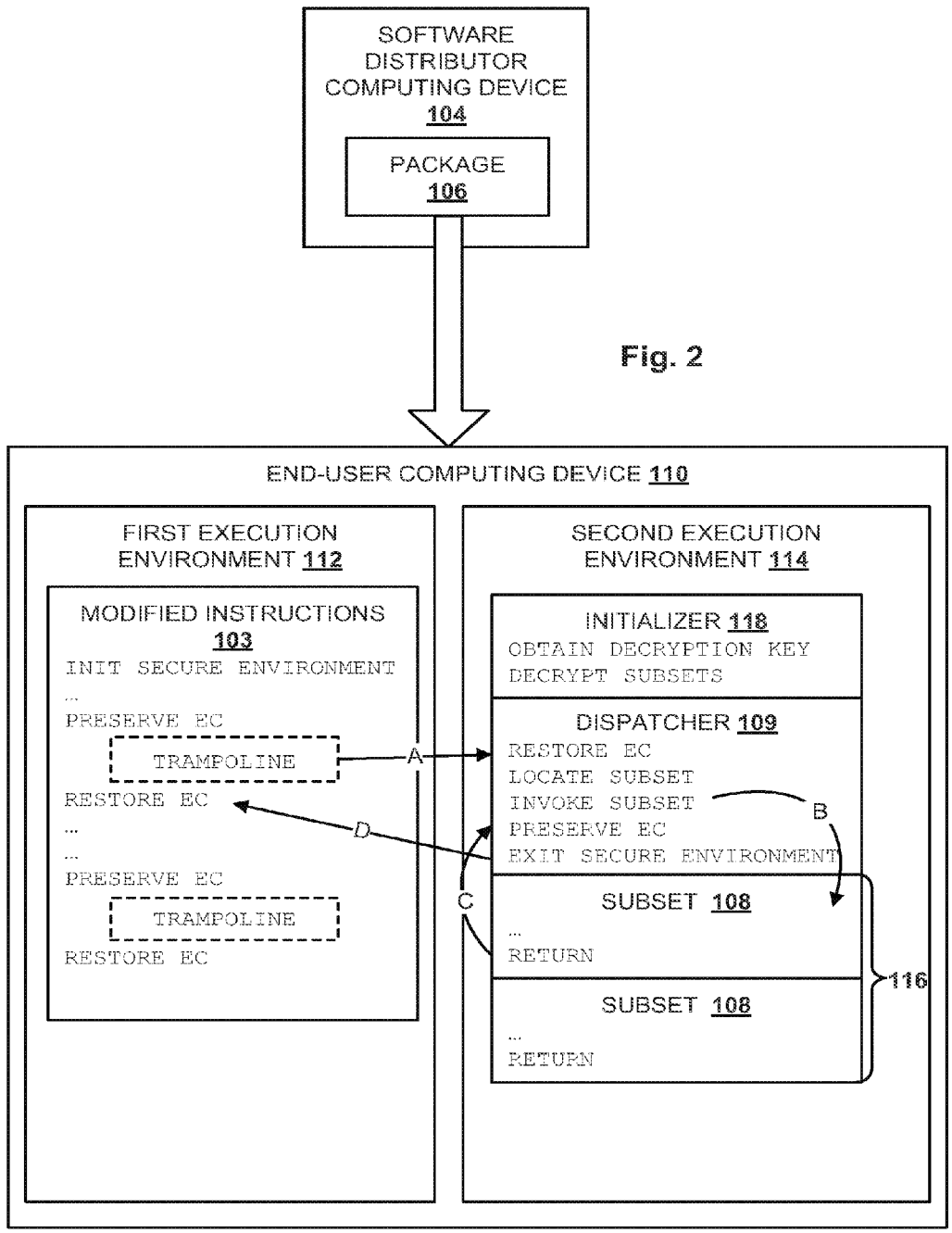
FIG. 2 schematically illustrates an example of how the plurality of instructions may be provided to an end user system and executed in a manner that enhances security, in accordance with various embodiments.

Referring to FIG. 2, converted package 106 may be distributed to one or more end users for execution on an end-user computing device 110. As will be discussed in more detail below, end-user computing device 110 may be configured to execute instructions in modified plurality of instructions 103 that preceded or followed a subset 108 in original plurality of instructions 102 in a first execution environment 112 with a first security level. End-user computing device 110 may be configured to execute dispatcher routine 109 and subsets 108 in a second execution environment 114 with a second security level that is more secure than the first security level. In various embodiments, in second execution environment 114, instructions and the nature of their execution may be hidden from the user. For example, instructions executed in second execution environment 114 may be stored in secure memory. Execution of subsets 108 in second execution environment 114 may make it more difficult for a user to copy or reverse engineer these subsets 108.

Referring back to FIG. 1, to convert plurality of instructions 102 to package 106 for distribution, software converter 105 may identify, extract (as indicated by the dashed boxes and corresponding dashed arrows) and/or encrypt one or more subsets 108 of plurality of instructions 102 that are suitable for execution in second execution environment 114. Subsets 108 of instructions suitable for execution in second execution environment 114 may be identified based on various criteria. In various embodiments, groups of instructions with a single entry point and a single exit point may be suitable for execution in second execution environment 114. In various embodiments, a suitable subset 108 may be a super basic block ("SBB"), which may include integer instructions that, when executed, operate on general-purpose registers ("GPRs"), such as RAX-R15 and parts thereof. In various embodiments, subsets 108 may include other types of instructions, such as direct jumps. In various embodiments where subsets 108 are relocated to separate (e.g., secure) memory on end-user computing devices (e.g., 110), instructions within subsets 108 may reference memory outside of the secure memory, in accordance with parameters of the secure environment.

Not all groups of instructions in plurality of instructions 102 may be suitable for execution in second execution environment 114. For example, a group of instructions that will operate on non-GPRs such as the reference instruction pointer ("RIP") or the reference stack pointer ("RSP"), such as PUSH or POP instructions, may not be suitable for execution in the secure environment. Another group of instructions that may not be suitable for execution in a more secure execution environment may be a group of instructions that includes one or more CALL instructions, since CALL instructions may require exception handling support and otherwise may increase complexity. In various embodiments, groups of instructions suitable for execution in second execution environment 114 may be identified using tools such as PIN tool for dynamic instrumentation of programs, provided by the Intel® Corporation of Santa Clara, Calif.

Various instructions may be added to plurality of instructions 102 (to create modified plurality of instructions 103) and/or to subset 108 to facilitate redirection between different execution environments. For example, one or more instructions to initialize second execution environment 114 may be added to plurality of instructions 102 prior to any subset 108. An example of this is seen in FIG. 1, where an INIT SECURE ENVIRONMENT instruction has been added to modified plurality of instructions 103 near the beginning. In various embodiments, such initialization instructions may be inserted before an entry point of modified plurality of instructions 103.

Additionally, instructions may be inserted into plurality of instructions 102 to redirect execution from first execution environment 112 to second execution environment 114. For instance, a group of instructions extracted from plurality of instructions 102 as a subset 108 may be replaced with one or more instructions—which may be referred to as "trampoline code"—to redirect execution to second execution environment 114. An example of this is seen in FIG. 1, where each subset 108 has been replaced in modified plurality of instructions 103 with TRAMPOLINE code.

In various embodiments, subsets 108 to be executed in second execution environment 114 may be stored separately from modified plurality of instructions 103. In FIG. 1, for instance, subsets 108 are packaged with dispatcher routine 109. As will be described in more detail below, TRAMPOLINE instructions may invoke dispatcher routine 109, which in turn may invoke execution of subsets 108. In some embodiments, instructions may be added to subsets 108 to return execution from the subset 108 back to dispatcher routine 109. For example, in FIG. 1, a RETURN instruction is inserted at the end of each subset 108. This may cause execution to return to dispatcher routine 109 after a subset 108 has executed.

If plurality of instructions 102 were executed without first being modified by disclosed methods, instructions contained therein would execute within a single execution context. As used herein, the term "execution context" may refer to the context in which instructions are executed, and may include various values stored in the GPRs and/or FLAGS registers (e.g., EFLAGS, RFLAGS) during execution of the program. Although values stored in these registers may be altered during execution, they may be altered in a manner that is presumably controlled by and accounted for by the computer program being executed.

However, package 106 may include multiple sets of instructions—e.g., modified plurality of instructions 103 and subsets 108—that may be executed in different execution environments. Redirecting execution between different execution environments may alter an execution context in a manner that may not be anticipated by or accounted for in plurality of instructions 102. This may lead to unpredictable and/or erroneous results. Accordingly, in various embodiments, the execution context may be preserved prior to transitions between execution environments, and restored after the transitions.

In various embodiments, one or more instructions to preserve the execution context, referred to herein as PRESERVE EC, may be added, e.g., by software converter 105, at various points of package 106 to preserve an execution context prior to redirection of execution from one execution environment to another. In various embodiments, a PRESERVE EC instruction may cause a snapshot of the values stored in the GPRs and/or FLAGS register to be stored in memory. In FIG. 1, a PRESERVE EC instruction has been added to modified plurality of instructions 103 prior to each instance of trampoline code.

PRESERVE EC instructions may also be incorporated into dispatcher routine 109 to preserve an execution context when redirecting execution from second execution environment 114 back to first execution environment 112. For instance, in FIG. 1, a PRESERVE EC instruction has been incorporated into dispatcher routine 109 after an instruction to invoke a subset 108.

After redirection from one execution environment to another, the execution context may be restored from the snapshot. In various embodiments, RESTORE EC instructions may be inserted into plurality of instructions 102 and/or included in dispatcher routine 109. For instance, in FIG. 1, a RESTORE EC instruction has been added to modified plurality of instructions 103 following each instance of trampoline code. Similarly, a RESTORE EC instruction is included in dispatcher routine 109 just prior to instructions to locate and invoke a particular subset.

In various embodiments, the encrypted subsets 108 may be concatenated, e.g., by software converter 105, to form concatenated subsets 116. In various embodiments, software converter 105 may generate an index of the concatenated subsets. In various embodiments, the index may include an offset associated with at least one of the subsets. In various embodiments, this offset may be passed as a parameter to trampoline code that causes redirection to second execution environment 114. In various embodiments, the index may also include a size associated with at least one of the subsets 108, which also may be passed as a parameter to trampoline code. In various embodiments, the index may additionally or alternatively include a relative virtual address ("RVA") associated with at least one of the subsets 108. In various embodiments, the RVA may be an address of the subset in original plurality of instructions 102, prior to extraction.

An example of how package 106 may be executed will now be described with reference to FIG. 2. Execution may initiate within first execution environment 112, starting at the beginning of modified plurality of instructions 103. For instance, the INIT SECURE ENVIRONMENT instruction, which as noted above may be very near or even before an entry point of modified plurality of instructions 103, may be executed to initiate second execution environment 114.

Modified plurality of instructions 103 may be executed until a PRESERVE EC instruction is reached. At that point an execution context may be preserved, e.g., by taking a snapshot of GPR/FLAGS values and storing the values in memory. Following the PRESERVE EC instruction, TRAMPOLINE code may redirect execution to second execution environment 114, as shown by arrow A. One or more functions contained in the TRAMPOLINE code, such as InvokeSE( ), may receive the preserved execution context as a parameter (e.g., as a pointer to memory storing the GPRs/FLAGS snapshot). InvokeSE( ) may receive other parameters as well, such as an RVA, offset and/or size of the subset 108 to be invoked.

Execution may then proceed in second execution environment 114. A RESTORE EC instruction may cause the preserved state of the GPRs/FLAGS to be restored from the snapshot. Next, the subset 108 to be invoked may be located within concatenated subsets 116. In various embodiments, a LOCATE SUBSET function may receive, as input, an offset or RVA associated with the subset, which may enable dispatcher routine 109 to locate the appropriate subset 108 within concatenated subsets 116. Once located, an INVOKE SUBSET instruction may jump to execution of the instructions contained in the appropriate subset 108, as indicated by arrow B.

As noted above, a RETURN instruction may have been inserted at the end of each subset 108. Once execution of subset 108 reaches this instruction, execution may return to dispatcher routine 109, as indicated by arrow C. Next, a PRESERVE EC instruction of dispatcher routine 109 may be executed to preserve the execution context. An EXIT SECURE ENVIRONMENT instruction may redirect execution back to first execution environment 112, as indicated by arrow D. After redirection back to first execution environment 112, a RESTORE EC instruction may be executed to restore the state of the GPRs/FLAGS that was preserved by dispatcher routine 109.

The embodiment describe above and shown in FIGS. 1 and 2 has been thus far described in general terms. Specific aspects may be implemented in various ways. For instance, in one example embodiment, software converter 105 may convert plurality of instructions 102 to package 106 as follows. Logic associated with software converter 105, which may be referred to herein as a "snippet finder," may search plurality of instructions 102 for subsets 108 suitable for execution in a more secure execution environment. The snippet finder may output a first header file containing a concatenation of all identified subsets, with a RETURN instruction inserted in between each subset. The snippet finder may output a second file that includes an index of tuples for each subset. Each tuple may include an RVA and size (e.g., in bytes) of a subset within the header file containing the concatenated subsets. The snippet finder may output a third file (which also may be a header file) containing an array of subset descriptors sorted by their RVAs in the original plurality of instructions 102.

The second file (that contains the index) may be used as input, along with original plurality of instructions 102, by another logic associated with software converter 105 to create modified plurality of instructions 103. The first and third files, containing the concatenated subsets and the array of subset descriptors, respectively, may be used as input to the same or yet another logic associated with software converter 105 to generate instructions that will be executed within second execution environment 114, including dispatcher routine 109 and the one or more encrypted subsets 108.

In addition to dispatcher routine 109 and subsets 108, instructions to be executed in second execution environment 114 may also include an initializer routine 118 that performs various operations relating to initialization of second execution environment 114. For example, initializer routine 118 may include one or more instructions to obtain a decryption key (e.g., from a user). Initializer routine 118 may also include one or more instructions to decrypt subsets 108 within the more secure execution environment, e.g., using a decryption key obtained from a user. In various embodiments, initializer routine 118 may be invoked upon initialization of second execution environment 114.

Figure 3:
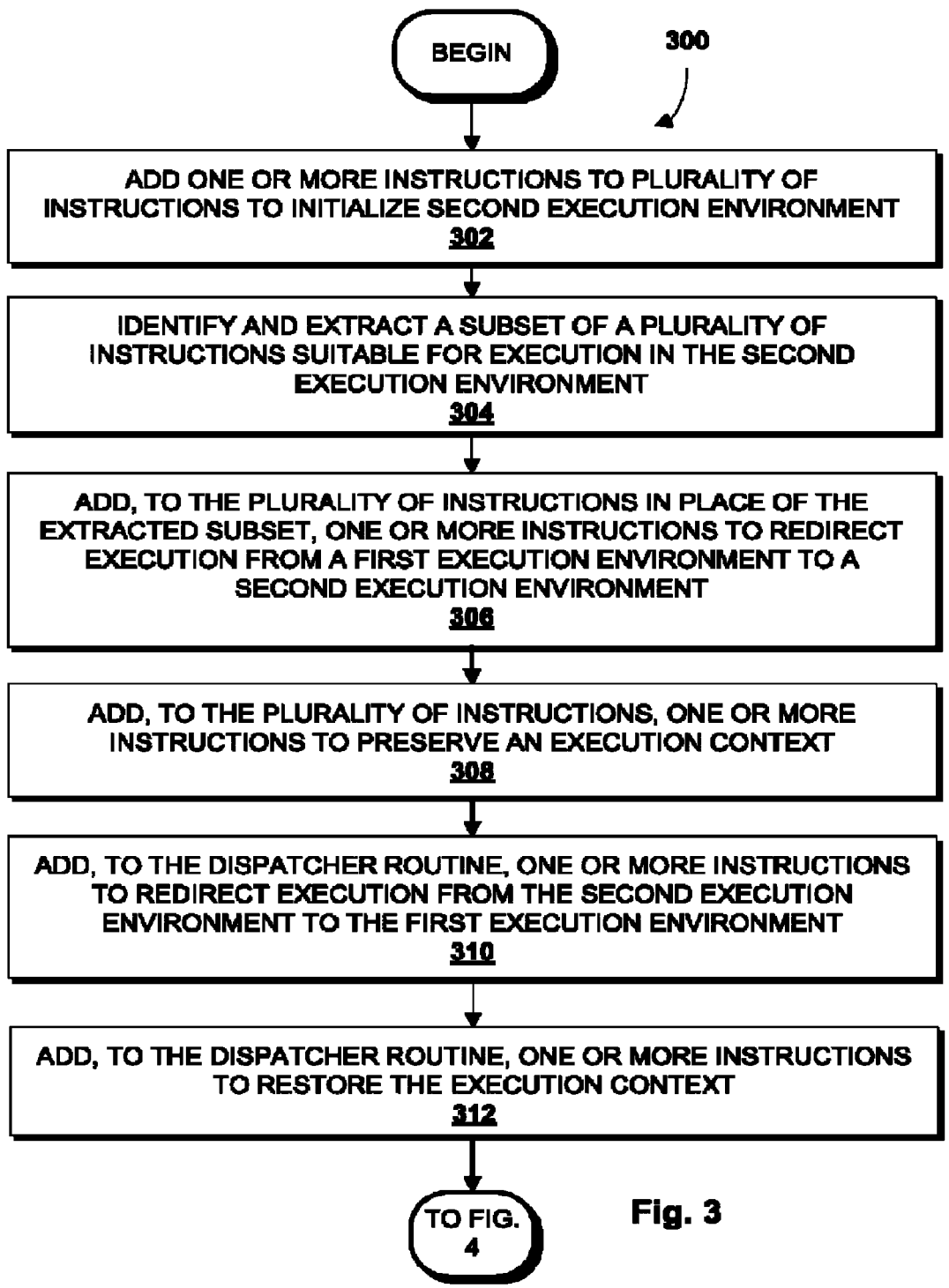
FIGS. 3-4 schematically depict an example method that may be implemented by various computing devices, in accordance with various embodiments.
Figure 4:
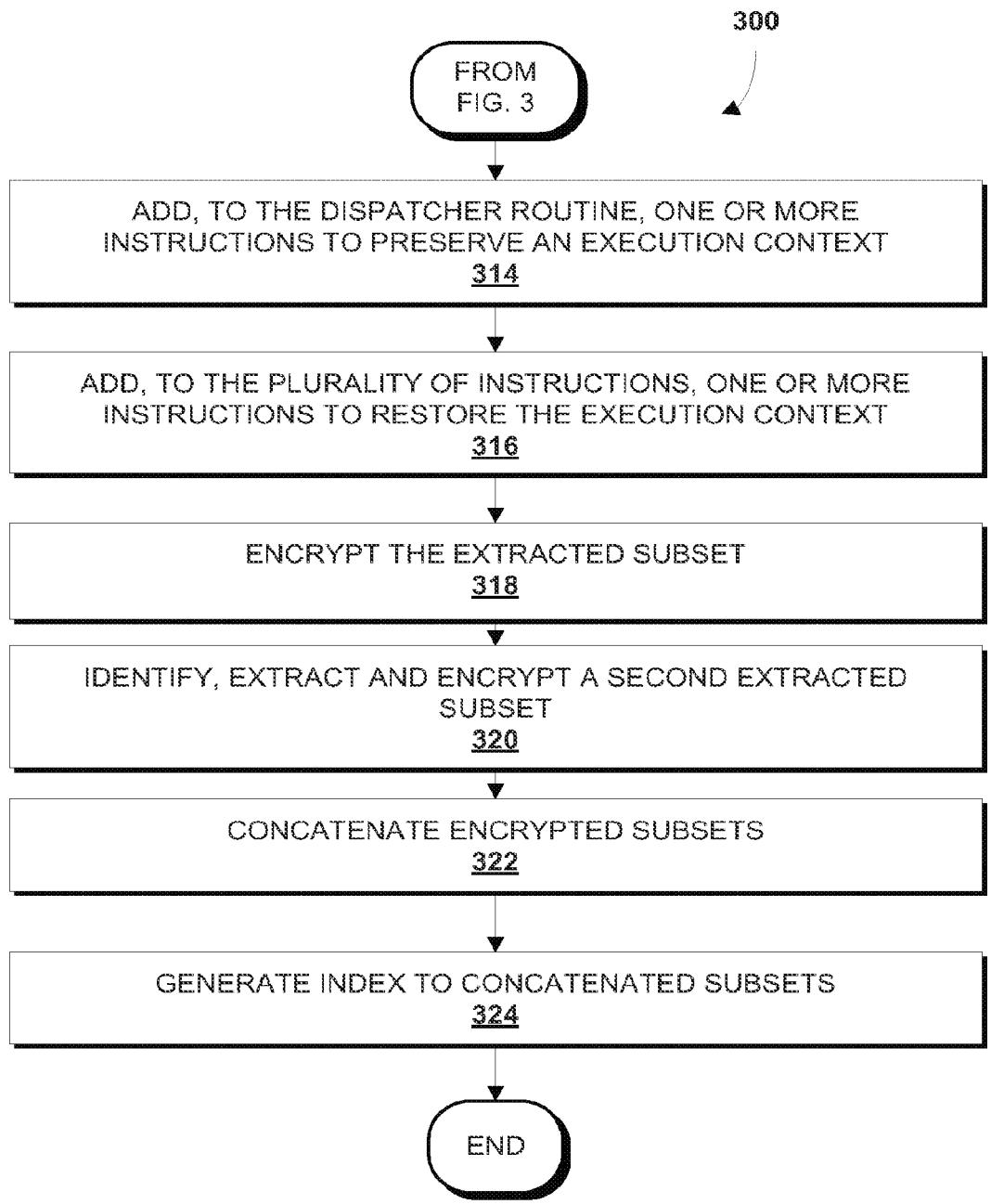

An example method 300 that may be implemented by software converter 105 is depicted in FIGS. 3 and 4. It shall be assumed that an end-user computing device such as end-user computing device 110 has at least a first execution environment 112, e.g., a default execution environment. It should be understood that while the operations of method 300 are shown in a particular order, this is not meant to be limiting, and the operations may be performed in any other order. Additionally or alternatively, one or more of the operations may be added or omitted.

After receiving plurality of instructions 102 as input, at block 302, one or more instructions to initialize second execution environment 114 may be added, e.g., by software converter 105, to plurality of instructions 102. At block 304, a group of plurality of instructions 102 may be identified and extracted as a subset 108. For example, groups of instructions with single entry and exit points may be identified and extracted, e.g., by being removed from plurality of instructions 102 and stored separately. At block 306, one or more instructions to redirect execution from first execution environment 112 to second execution environment 114 may be added, e.g., by software converter 105, to plurality of instructions in place of subset 108 that was extracted at block 304.

At block 308, one or more instructions to preserve an execution context may be added, e.g., by software converter 105, to plurality of instructions 102, e.g., just before the instruction to redirect execution from the first execution environment to the second execution environment. As noted above, this may permit execution of the subset of instructions in the second execution environment with the same GPRs/FLAGS values available as were available in the first execution environment.

At block 310, one or more instructions to redirect execution from the second execution environment back to the first execution environment may be added, e.g., by software converter 105, to dispatcher routine 109. At block 312, one or more instructions to restore the execution context after transition from the first execution environment to the second execution environment may be added, e.g., by software converter 105, to dispatcher routine 109.

Method 300 continues in FIG. 4. At block 314, one or more instructions to preserve an execution context may be added, e.g., by software converter 105, to dispatcher routine 109, e.g., just before an instruction to redirect execution back to the first execution environment. At block 316, one or more instructions to restore an execution context may be added, e.g., by software converter 105, to plurality of instructions 102. This may permit execution of plurality of instructions 102 to resume in the first execution environment with the same GPR/FLAGS values available as were available in the second execution environment.

At block 318, the identified and extracted subset 108 may be encrypted. In various embodiments, the subset 108 may remain encrypted until executed at an end-user computing device. In various embodiments, upon execution, the subset 108 may be decrypted in secure memory, e.g., associated with second execution environment 114, so that the decrypted instructions are not viewable by a user.

More than one subset 108 may be identified, extracted and encrypted. For instance, for a given computer program (e.g., plurality of instructions 102), there may be any number of groups of instructions that may be suitable for execution in a second, more secure environment.

An example of this is seen in FIG. 4. Assume that the subset mentioned in relation to blocks 302-318 is a first subset. At block 320, a second subset may be identified, extracted and encrypted, in the same way as the first subset was identified, extracted and encrypted. In various embodiments, at block 322, multiple encrypted subsets such as the first and second subsets may be concatenated. In this manner they may be stored in a single memory block that, in some embodiments, may be separate from a memory block storing plurality of instructions 102.

In various embodiments, at block 324, an index may be generated, e.g., by software converter 105. As noted above, the index may include various information about concatenated subsets, such as an RVA, and/or a size/offset associated with at least one of the concatenated subsets.

Figure 5:
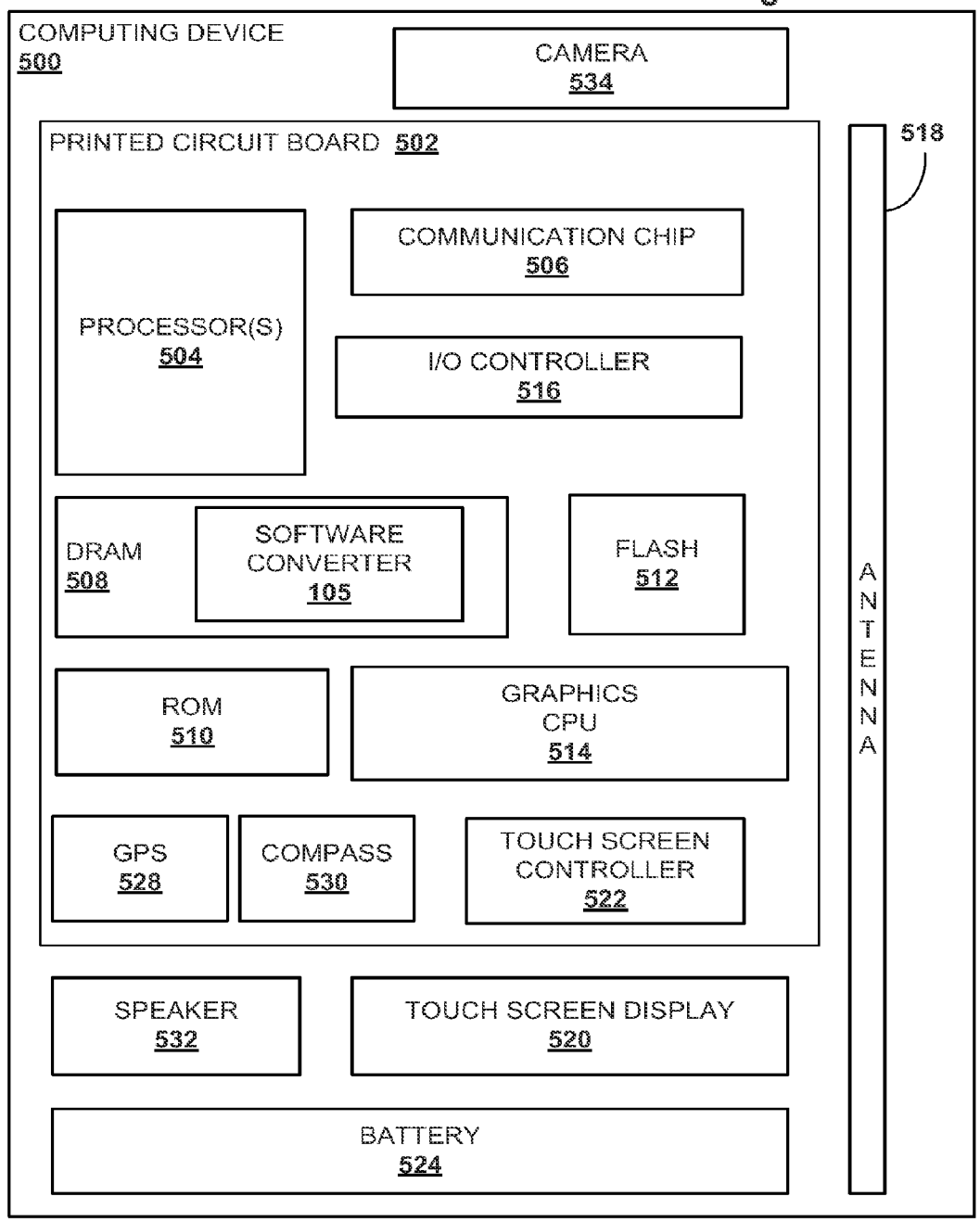
FIG. 5 schematically depicts an example computing device on which disclosed methods and computer-readable media may be implemented, in accordance with various embodiments.

FIG. 5 illustrates an example computing device 500, in accordance with various embodiments. Computing device 500 may include a number of components, a processor 504 and at least one communication chip 506. In various embodiments, the processor 504 may be a processor core or may comprise multiple processor cores. In various embodiments, the at least one communication chip 506 may also be physically and electrically coupled to the processor 504. In further implementations, the communication chip 506 may be part of the processor 504. In various embodiments, computing device 500 may include printed circuit board ("PCB") 502. For these embodiments, processor 504 and communication chip 506 may be disposed thereon. In alternate embodiments, the various components may be coupled without the employment of PCB 502.

Depending on its applications, computing device 500 may include other components that may or may not be physically and electrically coupled to the PCB 502. These other components include, but are not limited to, volatile memory (e.g., dynamic random access memory 508, also referred to as "DRAM"), non-volatile memory (e.g., read only memory 510, also referred to as "ROM"), flash memory 512, a graphics processor 514, a software converter 105 (which is shown in FIG. 5 as software in DRAM 508 but may also be hardware), a digital signal processor (not shown), a crypto processor (not shown), an input/output ("I/O") controller 516, an antenna 518, a display (not shown), a touch screen display 520, a touch screen controller 522, a battery 524, an audio codec (not shown), a video codec (not shown), a global positioning system ("GPS") device 528, a compass 530, an accelerometer (not shown), a gyroscope (not shown), a speaker 532, a camera 534, and a mass storage device (such as hard disk drive, a solid state drive, compact disk ("CD"), digital versatile disk ("DVD")) (not shown), and so forth. In various embodiments, the processor 504 may be integrated on the same die with other components to form a System on Chip ("SoC").

In various embodiments, volatile memory (e.g., DRAM 508), non-volatile memory (e.g., ROM 510), flash memory 512, and the mass storage device may include programming instructions configured to enable computing device 500, in response to execution by processor(s) 504, to practice all or selected aspects of method 300, e.g., by operating software converter 105. For example, one or more of the memory components such as volatile memory (e.g., DRAM 508), non-volatile memory (e.g., ROM 510), flash memory 512, and the mass storage device may include temporal and/or persistent copies of instructions configured to enable computing device 500 to practice disclosed techniques, such as all or selected aspects of method 300.

The communication chip 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to Wi-Fi (IEEE 802.11 family), WiMAX (IEEE 802.16 family), IEEE 802.20, Long Term evolution ("LTE"), Ev-DO, HSPA+, HSDPA+, HSUPA+, EDGE, GSM. GPRS, CDMA. TDMA, DECT, Bluetooth, derivatives thereof, as well as any other wireless protocols that are designated as 3G, 4G, 5G, and beyond. The computing device 500 may include a plurality of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, Ev-DO, and others.

In various embodiments, processor 504 (or one of its processor cores) may be packaged together with software converter 105. For one embodiment, processor 504 (or one of its processor cores) may be packaged together with software converter 105 to form a System in Package (SiP). For one embodiment, processor 504 (or one of its processor cores) may be packaged together with software converter 105, and may be integrated on the same dic. For one embodiment, processor 504 (or one of its processor cores) may be packaged together with software converter 105 to form a System on Chip (SoC).

In various implementations, the computing device 500 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 500 may be any other electronic device that processes data.

Embodiments of apparatus, computer-implemented methods, systems, devices, and computer-readable media (transitory and non-transitory) are described herein for identifying and encrypting a subset of a plurality of instructions. In various embodiments, the subset may include a single entry point and a single exit point. In various embodiments, one or more instructions of the plurality of instructions that precede or follow the subset may be executed in a first execution environment with a first security level. In various embodiments, the subset may be executed in a second execution environment with a second security level that is more secure than the first security level.

In various embodiments, one or more instructions to return execution from the second execution environment to the first execution environment may be associated with the subset. In various embodiments, one or more instructions to initialize the second execution environment may be added to the plurality of instructions before the subset. In various embodiments, one or more instructions to preserve an execution context prior to redirection of execution from the first execution environment to the second execution environment may be added to the plurality of instructions. In various embodiments, one or more instructions to restore the execution context after execution returns to the first execution environment from the second execution environment may be added.

In various embodiments, the subset may be a first subset. In various embodiments, a second subset may be identified and encrypted. In various embodiments, the first and second subsets may be concatenated. In various embodiments, an index of the concatenated first and second subsets may be generated. In various embodiments, the index may include a relative virtual address, offset and/or size associated with at least one of the first and second subsets.

In various embodiments, a dispatcher routine may be generated to be invoked upon redirection of execution into the second execution environment. In various embodiments, the dispatcher routine may itself invoke the subset and redirect execution back to the first execution environment after execution of the subset. In various embodiments, one or more instructions to restore an execution context prior to invocation of the subset and to preserve the execution context after execution of the subset may be added to the dispatcher routine.

In various embodiments, at least one computer-readable medium may have computer-readable code embodied therein. The computer-readable code may include a first set of instructions to be executed in a first execution environment of a computing device with a first security level, and a second set of instructions, that includes a single entry point and a single exit point, to be executed in a second execution environment of the computing device with a second security level that is more secure than the first security level. In various embodiments, the first set of instructions may include at least one instruction to redirect execution to the second execution environment and at least one instruction to preserve an execution context prior to redirection of execution to the second execution environment. In various embodiments, the second set of instructions may include at least one instruction to restore the execution context.

In various embodiments, the first set of instructions may include, prior to the at least one instruction to redirect execution to the second execution environment, one or more instructions to initialize the second execution environment. In various embodiments, a third set of instructions that includes a single entry point and a single exit point may be configured to be executed in the second execution environment.

In various embodiments, the second and third sets of instructions may be encrypted and concatenated. In various embodiments, an index of the concatenated second and third sets of instructions may include a relative virtual address associated with at least one of the first and second sets. In various embodiments, the index may include a size and offset associated with at least one of the second and third sets.

In various embodiments, one or more instructions may form a dispatcher routine. In various embodiments, the dispatcher routine may be invoked upon redirection of execution into the second execution environment. In various embodiments, the dispatcher routine may invoke the second set of instructions and redirect execution back to the first execution environment after execution of the second set of instructions.

In various embodiments, the second set of instructions may be encrypted. In various embodiments, the medium may include one or more instructions that form an initializer routine to be executed in the second execution environment, the initializer routine to decrypt the second set of instructions.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. At least one non-transitory computer-readable medium having computer-readable code embodied therein, the computer-readable code configured to enable a computing device, in response to execution of the code, to:
   identify and encrypt a first subset of a first plurality of instructions, wherein the first subset comprises a basic block including a second plurality of instructions of the first plurality of instructions, wherein the basic block includes only a single entry point and only a single exit point, to enable one or more instructions of the first plurality of instructions that precede or follow the first subset to be executed in a first execution environment with a first security level, and to enable the first subset to be executed in a second execution environment with a second security level that is more secure than the first security level;
   identify and encrypt a second subset; and
   concatenate the first and second subsets, the first and second subsets to be executed in the second execution environment; and
   generate an index of the concatenated first and second subsets, the index to include a relative virtual address associated with at least one of the first and second subsets.

2. The at least one computer-readable medium of claim 1, wherein the code, in response to execution by the computing device, further enables the computing device to associate, with the first subset, one or more instructions to return execution from the second execution environment to the first execution environment.

3. The at least one computer-readable medium of claim 1, wherein the code, in response to execution by the computing device, further enables the computing device to add, to the first plurality of instructions before the first subset, one or more instructions to initialize the second execution environment.

4. The at least one computer-readable medium of claim 1, wherein the code, in response to execution by the computing device, further enables the computing device to add, to the first plurality of instructions, one or more instructions to preserve an execution context prior to redirection of execution from the first execution environment to the second execution environment.

5. The at least one computer-readable medium of claim 4, wherein the code, in response to execution by the computing device, further enables the computing device to add, to the first plurality of instructions, one or more instructions to restore the execution context after execution returns to the first execution environment from the second execution environment.

6. The at least one computer-readable medium of claim 1, wherein the code, in response to execution by the computing device, further enables the computing device to generate an index of the concatenated first and second subsets, the index to include a size and offset associated with at least one of the first and second subsets.

7. The at least one computer-readable medium of claim 1, wherein the code, in response to execution by the computing device, further enables the computing device to generate a dispatcher routine to be invoked upon redirection of execution into the second execution environment, the dispatcher routine to invoke the first subset and redirect execution back to the first execution environment after execution of the second subset.

8. At least one non-transitory computer-readable medium having computer-readable code embodied therein, the computer-readable code comprising:
   a first set of instructions to be executed in a first execution environment of a computing device with a first security level;
   a second set of instructions, that includes a plurality of instructions, wherein the plurality of instructions includes only a single entry point and only a single exit point, to be executed in a second execution environment of the computing device with a second security level that is more secure than the first security level;
   a third set of instructions, that includes a single entry point and a single exit point, to be executed in the second execution environment, wherein the second and third sets of instructions are encrypted and concatenated; and
   an index of the concatenated second and third sets of instructions that comprises a relative virtual address associated with at least one of the second and third sets; and
   wherein the first set of instructions includes at least one instruction to redirect execution to the second execution environment and at least one instruction to preserve an execution context prior to redirection of execution to the second execution environment, and wherein the second set of instructions includes at least one instruction to restore the execution context.

9. The at least one computer-readable medium of claim 8, wherein the first set of instructions includes, prior to the at least one instruction to redirect execution to the second execution environment, one or more instructions to initialize the second execution environment.

10. The at least one computer-readable medium of claim 8, wherein the index further comprises a size and offset associated with at least one of the first and second sets.

11. The at least one computer-readable medium of claim 8, further comprising one or more instructions that form a dispatcher routine, the dispatcher routine to be invoked upon redirection of execution into the second execution environment, the dispatcher routine to invoke the second set of instructions and redirect execution back to the first execution environment after execution of the second set of instructions.

12. The at least one computer-readable medium of claim 11, wherein the second set of instructions is encrypted, the medium further comprising one or more instructions that form an initializer routine to be executed in the second execution environment, the initializer routine to decrypt the second set of instructions.

13. The at least one computer-readable medium of claim 12, wherein the dispatcher routine includes one or more instructions to restore an execution context prior to invocation of the second set of instructions and to preserve the execution context after execution of the second set of instructions.

14. A computer-implemented method, comprising:
identifying and extracting, by a computing device, a first subset of a first plurality of instructions, wherein the first subset comprises a basic block including a second plurality of instructions, wherein the basic block includes only a single entry point and only a single exit point;
adding, by the computing device, to the first plurality of instructions in place of the extracted first subset, one or more instructions to redirect execution from a first execution environment with a first security level to a second execution environment with a second security level that is more secure than the first security level;
adding, by the computing device, the first subset to a third plurality of instructions to be executed in the second execution environment, wherein the first plurality of instructions is to be executed in the first execution environment;
encrypting, by the computing device, the first subset;
identifying and encrypting, by the computing device, a second subset of the plurality of instructions; and
concatenating, by the computing device, the first and second subsets;
generating, by the computing device, an index of the concatenated first and second subsets, the index to include a relative virtual address associated with at least one of the first and second subsets; and
adding, by the computing device, to the third plurality of instructions, one or more instructions to redirect execution from the second execution environment to the first execution environment.

15. The computer-implemented method of claim 14, further comprising adding, by the computing device, to the first plurality of instructions before the one or more instructions to redirect execution from the first execution environment to the second execution environment, one or more instructions to initialize the second execution environment.

16. The computer-implemented method of claim 14, further comprising adding, by the computing device, to the first plurality of instructions before the one or more instructions to redirect execution from the first execution environment to the second execution environment, one or more instructions to preserve an execution context.

17. A system, comprising:
one or more processing units;
a memory operably coupled to the one or more processing units;
a first execution environment having a first security level;
a second execution environment having a second security level that is more secure than the first security level; and
a software converter to be operated by the one or more processing units and configured to:
identify and encrypt a first subset of a first plurality of instructions suitable for execution in the second execution environment, to enable one or more instructions of the first plurality of instructions that precede or follow the subset to be executed in the first execution environment, to enable the first subset to be executed in the second execution environment;
identify and encrypt a second subset; and
concatenate the first and second subsets, the first and second subsets to be executed in the second execution environment;
generate an index of the concatenated first and second subsets, the index to include a relative virtual address associated with at least one of the first and second subsets; and
add, to the first plurality of instructions which are before the first subset, one or more instructions to preserve an execution context prior to redirection of execution from the first execution environment to the second execution environment;
wherein the subset comprises a basic block including a second plurality of instructions of the first plurality of instructions, wherein the basic block includes only a single entry point and only a single exit point.

18. The system of claim 17, wherein the software converter is further configured to add, to the first plurality of instructions following the first subset, one or more instructions to initialize the second execution environment.

19. The system of claim 17, further comprising a touch screen display.

* * * * *